United States Patent [19]

Foreman et al.

[11] 3,958,458

[45] May 25, 1976

[54] ACOUSTIC EMISSION FLOW MEASUREMENT SYSTEM

[75] Inventors: Kenneth M. Foreman, North Bellmore; Richard A. Oman, Huntington, both of N.Y.

[73] Assignee: Grumman Aerospace Corporation, Bethpage, N.Y.

[22] Filed: Aug. 26, 1974

[21] Appl. No.: 500,519

[52] U.S. Cl. ............................................. 73/194 B
[51] Int. Cl.² ............................................ G01F 1/20
[58] Field of Search ................ 73/194 A, 194 B; 340/239 R

[56] References Cited
UNITED STATES PATENTS

| | | | |
|---|---|---|---|
| 2,936,619 | 5/1960 | Gibney | 73/194 B |
| 3,021,708 | 2/1962 | November et al. | 73/194 B |
| 3,580,092 | 5/1971 | Scarpa | 73/194 B |
| 3,641,994 | 2/1972 | Gosling et al. | 73/194 A X |
| 3,821,726 | 6/1974 | Chang et al. | 73/194 B X |
| 3,834,227 | 9/1974 | Patterson et al. | 73/194 B X |

*Primary Examiner*—Charles A. Ruehl
*Attorney, Agent, or Firm*—Morgan, Finnegan, Pine, Foley & Lee

[57] ABSTRACT

Pseudo sound created by the interaction of fluid flowing over a discontinuity in a conduit is sensed by a transducer. The transducer signal is reduced to a frequency-amplitude distribution and the amplitude at the characteristic frequency is used to calculate fluid flow rate using a dipole model. The apparatus is non-intrusive and passive. Several transducers may be serviced by a single central, processor remote from the transducer site.

Alternative apparatus provides for the determination of change in fluid flow direction and fluid density.

13 Claims, 2 Drawing Figures

ACOUSTIC EMISSION FLOW MEASUREMENT SYSTEM

The present invention relates to methods and apparatus for remotely monitoring fluid flow in a conduit; and more particularly to non-intrusive, passive acoustic devices which are responsive to local sound pressure waves transmitted through a conduit by fluid flowing therein.

BACKGROUND OF THE INVENTION

In liquid flow installations, particularly urban hydrology, there is a need for volumetric flow measurement systems as operational intelligence tools. Many costly, delicate, or complex methods exist for scientific investigation of steady and unsteady flow in open or closed channels. However, for various reasons prior art devices have not been acceptable for use in operational applications due to several factors including high cost and complexity; vulnerability to damage by large objects in the flow; difficulty of installation and maintenance in existing or new installations; inability to give valid data for partially filled as well as fully filled and pressurized liquid flow conditions; and risk of loss due to vandalism.

PRIOR ART

Gibney, U.S. Pat. No. 2,936,619 discloses a device for measuring fluid flow in which uniform serrations are formed on the interior wall surface of a pipe section so that the kinetic energy of the liquid flowing through the pipe creates sound pressure waves as it impinges upon the serrations. The serrations are spaced in accordance with the velocity of sound in the conduit material and the characteristic frequency of the transducer used to measure the sound pressure levels. In addition the conduit wall thickness must be an integral multiple of the spacing between serrations for proper flow determination. Since the device is based on the uniformity of the serrations sedimentary build up or wear of serrations may adversely affect the accuracy of the device.

Another method of measuring flow using acoustic techniques is disclosed in Scarpa, U.S. Pat. No. 3,580,092 wherein a transducer pick-up member is secured to the exterior of a pipe and is responsive to ultrasonic radiation generated by the shearing action of the fluid flowing in the conduit. The output from the circuitry varies as a function of the inverse square of the fluid flow with a result that with increasing flow rates the output signal decreases rapidly. Also physical changes in the density or composition of the fluid may adversely affect accuracy.

SUMMARY OF THE INVENTION

In accordance with the present invention a passive, non-intrusive transducer responsive to local sound pressure waves is attached to the exterior of a conduit to sense full or partial flow conditions. The transducer may be of several types, including dynamic microphone, accelerometer or piezo electric pick-up. The electrical signals produced by the transducer are transmitted to a signal processor remote from the transducer by means of a wireless transmitter or direct wire connection. The sensor system is self-contained and may be moved from place to place or permanently installed at the conduit. Electrical power is supplied to the sensor system when interrogated, by means of a self-contained long life battery or by means of a suitable power line.

The signal processor reduces the total transducer signal to a frequency-amplitude distribution. The frequency-amplitude distribution generated by the signal processor is then utilized to determine flow characteristics including: the direction of flow from a study of the frequency; the volumetric flow rate by comparing the measured amplitude distribution against a stored reference calibration signal at the characteristic frequency using a dipole model; fluid density; and condition of the conduit's internal surface evidenced by a shifting of the characteristic frequency at the observation point when comparing the measured distribution with amplitude relationships at adjacent frequencies, and its harmonics. The output from the signal processor is directed to suitable readouts which may either represent individual flow rates, or averages, over all the frequencies calculated.

The present invention contemplates the use of a single signal processing network to service a plurality of sensor systems located at various locations which may be periodically or continuously interrogated and processed, or their signals stored for later analysis and comparison.

The sound pressure wave fluctuations measured by the present invention are of the dipole nature produced by the interaction of the flow with inherent discontinuous characteristics of the solid interior surface of the flow conduit. The discontinuities are located where the conduit cross-section changes or flow direction changes abruptly. The sound is produced by partial or full flow and is in the audio to ultrasonic frequency range of the spectrum. The sound is directly proportional to the fourth power of flow rate at specific frequencies characterized by the solid surface features of the conduit. For this reason, sufficient signal strength is available even for low flow rates.

DETAILED DESCRIPTION

Figure 1:
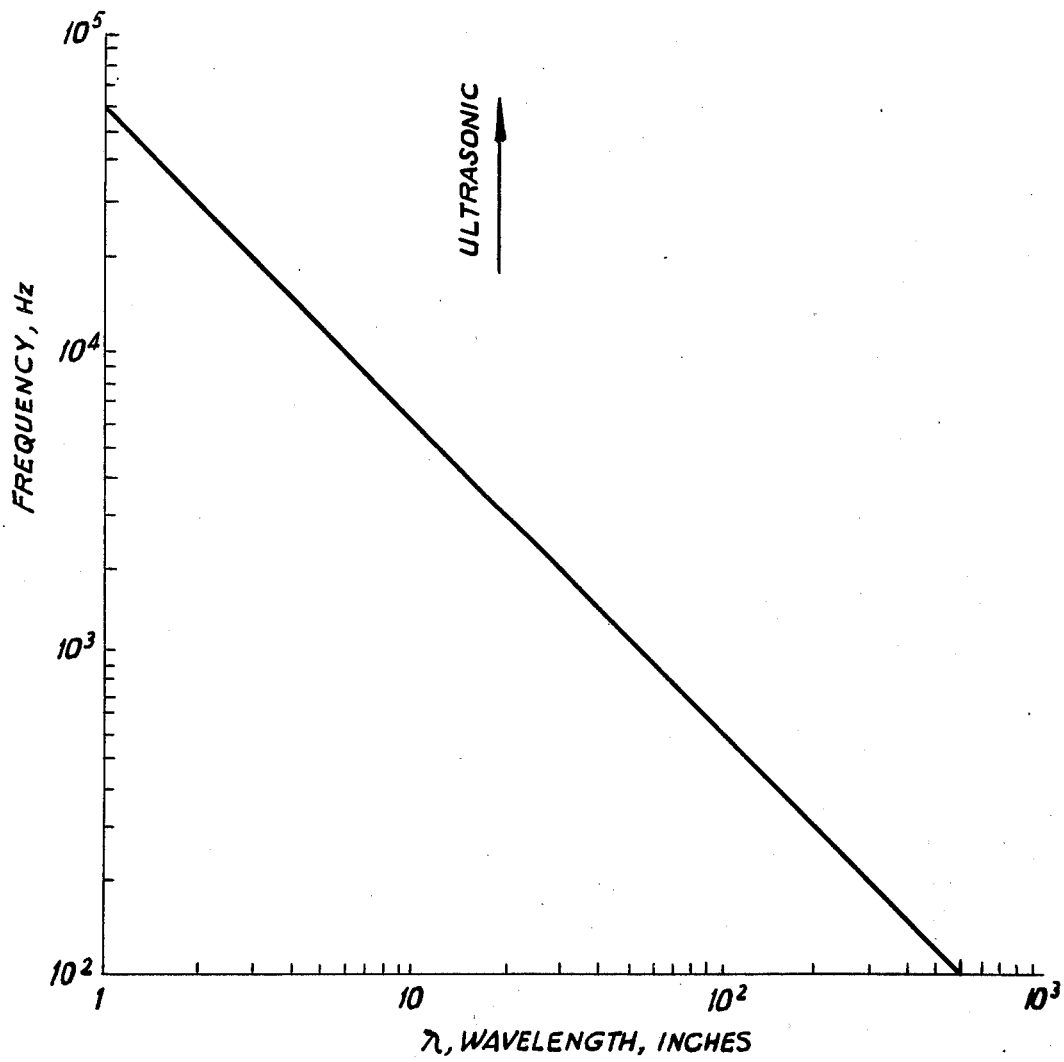
FIG. 1 is a graph illustrating the relationship of characteristic frequency to wavelength in water.

While this invention is susceptible of embodiment in many different forms, there is shown in the drawings and will hereinafter be described in detail a preferred embodiment of the invention and modifications thereto, with the understanding that the present disclosure is to be considered as an exemplification of the principles of the invention and is not intended to limit the invention of the embodiments illustrated.

INTRODUCTION

Fluid flowing through a conduit, such as pipes or ducts, creates sound whether it is caused by pressure variations resulting from overall flow unsteadiness, local conduit discontinuities or flow-embedded turbulence. Some of these pressure disturbances remain local and can be measured at the conduit wall as near-field sound produced by local momentum changes in the fluid. This near-field sound is also referred to as pseudo-sound to distinguish it from the pressure variations that become acoustically coupled to the propagation mode of the fluid and travel with the fluid's sonic speed to become the far-field radiation.

There are basically three main flow mechanisms that could result in an acoustic source. The mechanisms produce either a monopole source, a dipole source, or a quadrupole source. The dipole source is utilized in accordance with the present invention to determine flow rate, variations in flow rate, density and changes in flow direction.

The dipole radiation intensity, I is related to:

$$I = \bar{\rho} l^2 \bar{u}_3 / c^3 \bar{u}^3 \qquad 1$$

In equation 1, C is the fluid's sonic speed; $\bar{\rho}$ is the average fluid density; l is the characteristic dimension of the flow conduit; and $\bar{u}$ is a representative velocity of the flow.

In steady (or relatively slowly varying) flow the total rate of energy flow will be proportional to $\bar{\rho} l^2 \bar{u}^3$.

Therefore, the ratio of acoustic to flow energy is proportional to $$(\bar{u}/c)^3$$

and is a measure of acoustic efficiency of the sound source. The dipole source assumption is valid for generally encountered urban hydrology situations where the characteristic dimension is less than the acoustic wavelength.

The total sound power, $P_T$, of a dipole source in a free field is:

$$P_T \simeq P^2/\bar{\rho} c \cdot l^2 \qquad 2$$

In equation 2, p is the pressure disturbance caused by a surface discontinuity of size magnitude $\delta$ p may also be represented by the flow quantity:

$$p \simeq Kq \simeq (K/2)(\bar{\rho}\bar{u}^2) \qquad 3$$

In equation 3, K is the pressure loss factor and q is the dynamic pressure of the flow. Combining equations 2 and 3 yields:

$$P_T \simeq K^2 \bar{\rho} l^2 \bar{u}^4 / c \qquad 4$$

Some of the sound is prevented from being transmitted downstream within the conduit by blockage, $\epsilon$, of the discontinuity (i.e., shadowing). Also the transmitted sound power through the duct walls will depend upon the transmission coefficient, $\tau$, of the material used in duct construction. Thus the radiated sound power outside the conduit is:

$$P\text{rad} \simeq P_T \epsilon \tau \qquad 5$$

$$= K^2 \bar{\rho} l^2 \epsilon \tau \bar{u}^4 / c \qquad 5a$$

For the purposes of approximation, for a sound spectrum below the lowest excitation wavelength of the conduit corresponding to its circumference, $\tau$ can be considered independent of frequency and proportional to $l/h$ where $h$ is the conduit wall thickness of known construction material.

For discontinuities consisting of bends or branch points in a flow conduit $\epsilon$ tends to unity. Valves and metering sections will exhibit an $\epsilon$ less than 1.0 and the sound power will diminish accordingly. As the blockage produced by an adjustable valve increases, the local flow may approach high subsonic or transonic turbulent mixing conditions and the dipole source radiation characteristics may become obscured. Grouping equation 5a into parameters:

$$P\text{rad} = K^2 \bar{\rho}(l^2 \bar{u})(l/h)[\bar{u}^2(\bar{u}/c)] \qquad 6$$

In equation 6, the term $l^2\bar{u}$ is related to the volumetric flow rate, Q, and when $\bar{\rho}$ is the known mean fluid density, the product $\bar{\rho}l^2\bar{u}$ is related to fluid mass flow rate. Alternatively, the radiated sound pressure level is proportional to the fourth power of the flow rate since the flow rate is proportional to the velocity. The other terms in equation 6 may be derived from the conduit constructions details, e.g., $l/h$, K, or fluid properties, e.g., $\bar{\rho},c$ The term $\bar{u}/c$ is the Mach number of the flow and a measure of the validity of the assumed incompressibility of the flow. The term $\bar{\rho}\bar{u}^2$ is proportional to the mean dynamic pressure of the local flow. Thus the flow system variables that may influence the radiated sound can be distinguished, and empirical relationships secured from various types of flow in channels such as sewers.

SOUND TRANSMISSION

In measuring the sound level transmitted through a conduit there will be some attenuation due to differences in the acoustic resistance between the fluid, surrounding air, if any, and the conduit material. The relationship of sound transmission from one medium to another is:

$$P_{12} = (4r_1 r_2)/(r_1 + r_2)^2 \qquad 7$$

where $r_1$ and $r_2$ are the acoustic resistances ($\rho c/S$) of the mediums 1 and 2, respectively, and S is the exposed surface area.

CHARACTERISTIC FREQUENCY

The characteristic frequency, $f_o$, of the sound produced by a surface discontinuity in a conduit, such as a sudden expansion, is $$f_o = (P^*/\pi c)/\delta \qquad 8$$

In equation 8, p* is the finite pressure disturbance in the fluid and $\delta$ is the dimension of the discontinuity (e.g., in the example cited before equation 8, $\delta$ equals the radial step at the sudden expansion. Equation 8 is derived from the fundamental frequency equation $f = c/\lambda$ where $\lambda$ is the wavelength. In this manner, $\delta$ is equivalent to the wavelength, $\lambda$, in the fluid.

Thus, the physical discontinuity, $\delta$, provides a means for determining the characteristic frequency. FIG. 1 shows the graphical relationship between frequency, $f_o$, and wavelength ($\lambda$ or $\delta$) for fresh water, where $c = 15 \times 10^4$ cm/sec. By utilizing FIG. 1, the characteristic frequency, $f_o$, may be visually determined from any given conduct discontinuity geometry, such as a constriction, expansion, step, outfall, or elbow.

INSTRUMENTATION

Figure 2:
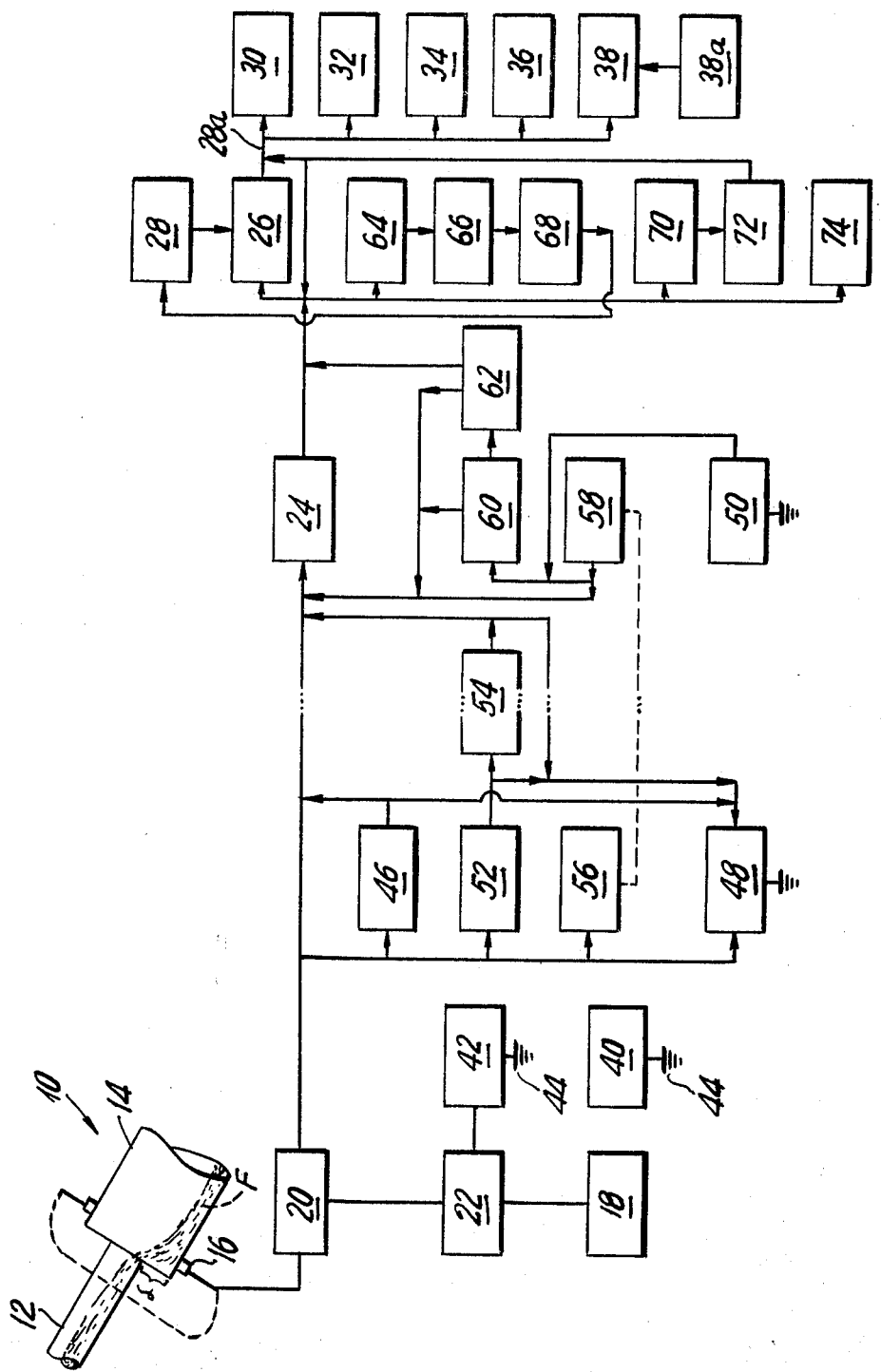
FIG. 2 is a schematic view illustrating the different apparatus in accordance with the present invention for analyzing fluid flow.

FIG. 2 shows the apparatus, and alternatives, for use in measuring fluid flow in accordance with the present invention. A conduit 10 having an entrance flow channel 12 and expansion channel 14 directs the flow of fluid F moving under the influence of a gravity gradient. It will be appreciated, of course, that other flow regimes may also be measured and that the gravity gradient is for illustrative purposes only.

A transducer 16 is attached to the exterior of the conduit adjacent to the expansion interface by suitable means, such as doubleface tape. Transducer 16 should be attached by means which will not only securely fasten the transducer to the conduit but also introduces only minimum sound attenuation. The transducer 16 is located closely adjacent to the expansion discontinuity, δ, and within the near field adjacent to the discontinuity.

Transducer 16 is actuated by means of an interrogator switch assembly 18, which energizes a relay 20 through a suitable receiver 22, to permit the transducer signal to be sent to a frequency-amplitude analyzer 24. Interrogator assembly 18 may be actuated by automated or manual means; while receiver 22 may be self-powered, it includes means for supplying electrical power to the relay 20 and allowing the transducer signal to reach analyzer 24.

Analyzer 24 processes the total, raw, real time signal from transducer 16 into its amplitude components over a continuous range of frequencies so that the characteristic frequency, $f_o$, for the particular transducer site and the harmonics of the characteristic frequency are available for use in calculating the flow rate quantity by equation 6, described above. The sound spectral distribution generated by analyzer 24 is introduced into an amplitude flow function generator 26 where the distribution is processed through the utilization of calibration data from calibrator 28 and the dipole model, discussed above, to produce a flow quantity signal. The flow rate quantity signal is directed through line 28a to any one of a plurality of readout devices including; a chart recorder 30 which plots the flow rate quantity signal; a tape recorder 32 which records the date for future retrival; a paper tape punch or printer 34; a visual display 36 which provides the data in digital or alpha-numeric form; or an integrator 38 which integrates the flow quantity signal over a desired period of time.

The total flow information in device 38 can be reset to zero by trigger 38a thereby permitting a new total value to be computed for a new time interval.

The basic flow measurement system is susceptible of a wide variety of mode operations, which will now be discussed. This flexibility of system design enables the measuring device to provide a wide variety of intelligence services at a minimum of cost.

The transducer and its associated electrical circuitry may be permanently installed at the conduit site. Measurements may be thus initiated by a wireless interrogator 40 which sends a signal to a self-powered receiver 42 through antennas 44. Receiver 42 in turn activates receiver 22 thereby operating relay 20 to initiate and terminate interrogation of the transducer 16. Receiver 42 may be powered by self-contained batteries which may be replaced at periodic intervals or may be powered directly from utility lines or private electrical lines.

Since the present invention contemplates its use with a wide variety of flow regimes and rates, it may be desirable to pre-process the raw data signal generated by transducer 16. To this end, the transducer signal may be preamplified by amplifier 46 to increase signal strength and then directed to a wireless transmitter 48 for transmission to a remote receiver 50.

Similarly the raw data from transducer 16 may be passed through a filter 52 to improve signal-to-noise ratio at the characteristic frequency or for harmonic frequencies and then directed to transmitter 48, either directly or indirectly after amplification by amplifier 54, or to frequency analyzer 24 after amplification. A still further alternative is to record the raw data from transducer 16 on magnetic tape, disc or cartridge in recorder 56 for later playback in device 58 at a remote location.

By suitable coding the carrier frequencies, particularly in the wireless transmission mode of operation, or by signal sequence modulation, several transmitters can be identified and serviced by one central receiver and processing unit.

In addition to the mode operations and apparatus which may be included at the conduit site, the signal processor may also include alternative intelligence apparatus depending upon the information to be derived. The data signal played back at device 58 may be processed directly by the frequency analyzer 24 for time delayed measurements or the signals can be amplified in amplifier 60 and then either directly sent to the frequency analyzer 24 or filtered by filter 62 and then sent to the frequency analyzer 24. If the filtered signal from filter 62 is a narrow band around the characteristic frequency and had been sufficiently amplified in amplifier 60, it may be directly fed into the flow function generator 26. Data signal received in the remote receiver 50 may also be processed in real time similar to the information played back through device 58.

During those investigations in which the entire frequency distribution is used, the output of the frequency analyzer 24 may be treated by a frequency scanner 64. Frequency scanner 64 is adapted to electronically compare the amplitudes of the signal at the characteristic frequency and frequencies adjacent to the characteristic frequency. This comparison may be displayed to provide an indication of whether the conduit's internal surface condition has changed significantly from its earlier or initial conditions. Such information is useful for operational or maintenance purposes in that it indicates such conditions as sedimentation buildup or blockages. A change at the flow discontinuity within the conduit, such as sedimentary buildup, manifests itself as a consistent shift of the local peak amplitude from the initial characteristic frequency to an adjacent frequency. This change is frequency results from the change in effective conduit discontinuity dimension, $\Delta\delta$, as compared to the initial or prior value of the discontinuity dimension. This may be expressed mathematically as $\Delta f \simeq c/\Delta\delta$ (see equation 8).

The signal may then be directed from scanner 64 to a ratio meter 66 where the signal amplitude, $S_i$, at other preselected frequencies, $f_i$ is divided electronically by the amplitude, $S_o$, at the characteristic frequency, $f_o$. This ratio, $(S_i/S_o)$, is compared to the third power of the ratio of the characteristic frequency to the frequency in question, $(f_o/f_i)^3$. If the two ratios are equal for a particular frequency, then the density of the fluid has changed and the ratio meter 66 will compute the new density, $\rho i$, by performing the mathematical calculation $\rho_i = \rho_o(f_o/f_i)^2$.

This comparison is based on the relationship of the speed of sound in a liquid to the density:

$$c^2 = E v/\rho \qquad 9$$

where $Ev$ is the volume modulus of elasticity $=(\rho/d\rho)d\rho$. $Ev$ at most working conditions can be considered a constant for fluids where water is the major constituent. Combining equations 8 and 9, yields:

$$f_o \simeq (1/\rho_o)^{1/2} \qquad 10$$

For a non-changing characteristic dimension δ, a change in density will produce a new characteristic frequency, $f_1$, which is related to the initial characteristic frequency by $f_1/f_o = (\rho_o/\rho_1)^{1/2}$. Using this relationship with that of the sound pressure level SPL $\simeq \rho/c \simeq \rho(\rho^{1/2}) = \rho^{3/2}$, the ratio of the amplitudes sound pressure level) is $SPL_1/SPL_o = (\rho_1/\rho_o)^{3/2} = (f_o/f_1)^3$. Ratio meter 66 may perform these calculations routinely or may be periodically queried so that only persistent fluid density changes will be revealed. In addition to computing the fluid density, the density may also be compared to a standard reference density, e.g., fresh water, and the ratio therebetween can be computed and displayed.

A still further processing option is the etermination of flow direction or flow direction change from the usual or anticipated flow direction. The direction indicator 68 determines the direction of flow based on the principle that a different characteristic frequency is associated with each of the two possible net flow directions for any given conduit physical discontinuity. This is due to the fact that the effective δ's are different for each direction and can be predicted a priori. Thus, the direction indicator 68 compares the amplitude of the signal, $(SPL)_o$, at the expected flow direction characteristic frequency, $f_o$, to the signal amplitude, $(SPL)_r$, at the predetermined frequency, $fr$, characterizing reversed direction fluid flow. If the ratio, $r/(SPL)_o$, is greater than 1 for a selected time period, the indicator shows that the net flow direction has reversed. If this ratio does not exceed 1 then the normal or expected flow direction is understood to prevail. The computation of the ratio of the amplitude of the reverse flow to the normal flow is repeated at predetermined intervals to maintain observation over the flow direction.

The direction of flow is important since associated with each of the two possible net flow directions, at any particular discontinuity, is a calibration factor to convert the flow function at generator 26 into a flow quantity. the directional information obtained by indicator 68 activates the calibration factor for eigher the normal or reversed flow direction in the calibrator 28, thereby feeding the proper factor into the function generator 26.

To improve the absolute accuracy of the signal used by the flow function generator 26, signal amplitudes may be extracted from the frequency distrubution for the characteristic frequency and for a limited number of harmonics by extractor 70. These amplitudes are then average in device 72 to reduce the noise components of the amplitudes and then directed to flow function generator 26.

Alternatively, the spectral distribution of the total signal from the frequency analyzer 24 may be stored in storage 74 for documentation or retrieval at a later time for analysis or processing.

These and other modifications may be made to the present invention without departing from the scope and spirit thereof as pointed out in the appended claims.

What is claimed is:

1. Apparatus for monitoring fluid flow in a conduit having a discontinuity, said discontinuity having a characteristic acoustic emission for each fluid and direction and magnitude of flow in said conduit, which comprises: a transducer responsive to pseudo-sound radiation; means for mounting said transducer on the exterior surface of said conduit within the near field of said discontinuity; circuit means electrically coupled to said transducer to derive a sound pressure signal output therefrom; signal processor means adapted to receive a signal output from said circuit means, said signal processor means including means for converting said signal to a frequency-amplitude distribution; means for selecting an amplitude from said distribution and generating a flow quantity according to a dipole acoustic model therefrom; and means connected to said processor means for utilizing the dipole model flow quantity derived therefrom.

2. Apparatus of claim 1, wherein said transducer is a piezoelectric pick-up device.

3. Apparatus of claim 1, wherein said circuit means includes a transmitter and said signal processor means includes a receiver responsive to signals from said transmitter.

4. Apparatus of claim 1, wherein said transducer is responsive to pseudo-sound radiation within a spectrum of frequencies extending from the audio range and beyond into the ultrasonic range.

5. Apparatus of claim 1, wherein said circuit means includes relay means for actuating said transducer.

6. Apparatus of claim 1, wherein said processing means includes means for calibrating said distribution.

7. Apparatus of claim 1, wherein said processing means includes means for generating said flow quantities for amplitudes corresponding to a characteristic frequency and frequencies adjacent to said characteristic frequency, and scanner means for comparing the magnitude of the flow quantities to detect frequency shifts in the amplitudes; whereby changes in the discontinuity may be observed.

8. Apparatus of claim 7, wherein said processing means includes means for calculating the fluid density.

9. Apparatus of claim 7, wherein said processing means includes means for determining changes in the direction of flow.

10. A method of determining flow in a conduit having a discontinuity therein comprising the steps of: securing a transducer to the exterior of said conduit and within the near field of said discontinuity, said transducer being responsive to pseudo-sound radiation; sensing with said transducer the near field acoustic sound pressure level signal generated by the interaction of the fluid flowing over said discontinuity; converting the signal derived from said transducer into a frequency-amplitude distribution; selecting an amplitude from said distribution at a predetermined frequency corresponding to the characteristic frequency of the discontinuity; calibrating said selected amplitude with given data; and generating a flow quantity according to a dipole acoustic model from said calibrated amplitude.

11. The method of claim 10, further comprising the step of transmitting said sound pressure level signal generated by said transducer to a location remote from said conduit, and performing said converting step at said remote location.

12. The method of claim 11, wherein said transmission step is provided by transmitting said signal as an electromagnetic wave.

13. A method of determining flow in a conduit having a discontinuity therein comprising the steps of: securing a transducer to the exterior of said conduit and within the near field of such discontinuity, said transducer being resonsive to pseudo-sound radiation; sensing with said transducer the sound pressure level signal generated by the interaction of the fluid flowing over said discontinuity; converting the signal derived from said transducer into a frequency-amplitude distribution; selecting an amplitude from said distribution at a predetermined frequency corresponding to the characteristic frequency of the discontinuity; calibrating said selected amplitude with given data; and utilizing said calibrated amplitude to calculate flow velocity in accordance with the formula $A = U^4$, where A is the calibrated amplitude and U is the flow velocity.

\* \* \* \* \*